United States Patent
Ishida et al.

(10) Patent No.: US 7,976,391 B2
(45) Date of Patent: Jul. 12, 2011

(54) GAME SYSTEM AND REPLACEMENT PART

(75) Inventors: Tetsuo Ishida, Tokyo (JP); Tetsuo Ishimaru, Tokyo (JP); Yasufumi Kasuya, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 873 days.

(21) Appl. No.: 11/813,501

(22) PCT Filed: Dec. 26, 2005

(86) PCT No.: PCT/JP2005/023725
§ 371 (c)(1),
(2), (4) Date: Aug. 8, 2007

(87) PCT Pub. No.: WO2006/073075
PCT Pub. Date: Jul. 13, 2006

(65) Prior Publication Data
US 2008/0096646 A1    Apr. 24, 2008

(30) Foreign Application Priority Data
Jan. 6, 2005    (JP) .................................. 2005-001633

(51) Int. Cl.
*A63F 9/24*    (2006.01)
(52) U.S. Cl. ........................................... 463/42; 463/43
(58) Field of Classification Search .................... 463/42, 463/43
See application file for complete search history.

(56) References Cited

U.S. PATENT DOCUMENTS

| | | | |
|---|---|---|---|
| 7,079,982 B2* | 7/2006 | Ogura et al. | 702/185 |
| 7,222,051 B2* | 5/2007 | Shibata et al. | 702/184 |
| 7,874,922 B2* | 1/2011 | Kasuya | 463/43 |
| 2004/0186687 A1* | 9/2004 | Ogura et al. | 702/185 |
| 2006/0046812 A1* | 3/2006 | Hiranoya et al. | 463/9 |
| 2008/0139320 A1* | 6/2008 | Kasuya | 463/42 |
| 2008/0313723 A1* | 12/2008 | Naono et al. | 726/7 |

FOREIGN PATENT DOCUMENTS

| | | |
|---|---|---|
| JP | 2000-288238 A | 10/2000 |
| JP | 2000-330432 A | 11/2000 |
| JP | 2001-070630 A | 3/2001 |
| JP | 2002-073832 A | 3/2002 |
| JP | 2002-297359 A | 10/2002 |
| JP | 2003-033564 A | 2/2003 |
| JP | 2003-033567 A | 2/2003 |
| JP | 2003-038841 A | 2/2003 |

* cited by examiner

*Primary Examiner* — Pierre E Elisca
(74) *Attorney, Agent, or Firm* — Edwards Angell Palmer & Dodge LLP; Peter C. Schechter; Brian R. Landry

(57) ABSTRACT

There is provided a game system for improving a maintenance property of a game machine in which a replacement part is provided. A replacement part D has a part information recording device 34c in which uniquely given part identification information is recorded. A game machine main body K includes a part information obtaining device 24 and a server transmission device 23. The part information obtaining device 24 obtains the part identification information. The server transmission device 23 transmits to a center server CS, game machine identification information uniquely given to a game machine G together with the obtained part identification information. The center server CS has a server storage device 12 for storing the received part identification information and the received game machine identification information in association with each other.

10 Claims, 15 Drawing Sheets

FIG. 12

| D CODE | STORE NAME | | | | | | | | |
|--------|-----------|---|---|---|---|---|---|---|---|
| ***** | ********** | | | | | | | | |
| ERROR LOG | | | | | | | | | |
| | | 2004/10/10 9:25 | | | | | | | |
| e-23X | * | * | * | * | * | * | * | * | |
| * | * | * | * | * | * | * | * | | |

FIG. 13

MONITERING OPERATIONAL STATUS IN EACH STORE

| D CODE | STORE NAME | NUMBER OF ERROR OCCURRENCES/DAY | NUMBER OF WARNING OCCURRENCES/DAY |
|---|---|---|---|
| ************ | ************ | 80 | 150 |
| ************ | ************ | 70 | 100 |
| ************ | ************ | 60 | 80 |
| ************ | ************ | 50 | 70 |
| ************ | ************ | 10 | 30 |
| ************ | ************ | 0 | 10 |
| ************ | ************ | 0 | 3 |
| ************ | ************ | 0 | 0 |

FIG. 14

ERROR OCCURRENCE STATUS OF EACH SELF-PROPELLED BODY

| | LINE OUT | TURN OVER | MOVE DELAY | LINE SKIP | DIST SKIP | POWER FAIL | GEAR UNIT OPERATING TIME | MOTOR UNIT OPERATING TIME |
|---|---|---|---|---|---|---|---|---|
| ID1 | | | | | | | | |
| ID2 | | | | | | | | |
| ID3 | | | | | | | | |
| ID4 | | | | | | | | |
| ID5 | | | | | | | | |
| ID6 | | | | | | | | |
| ID7 | | | | | | | | |
| ID8 | | | | | | | | |
| ID9 | | | | | | | | |
| ID10 | | | | | | | | |
| ID11 | | | | | | | | |
| ID12 | | | | | | | | |

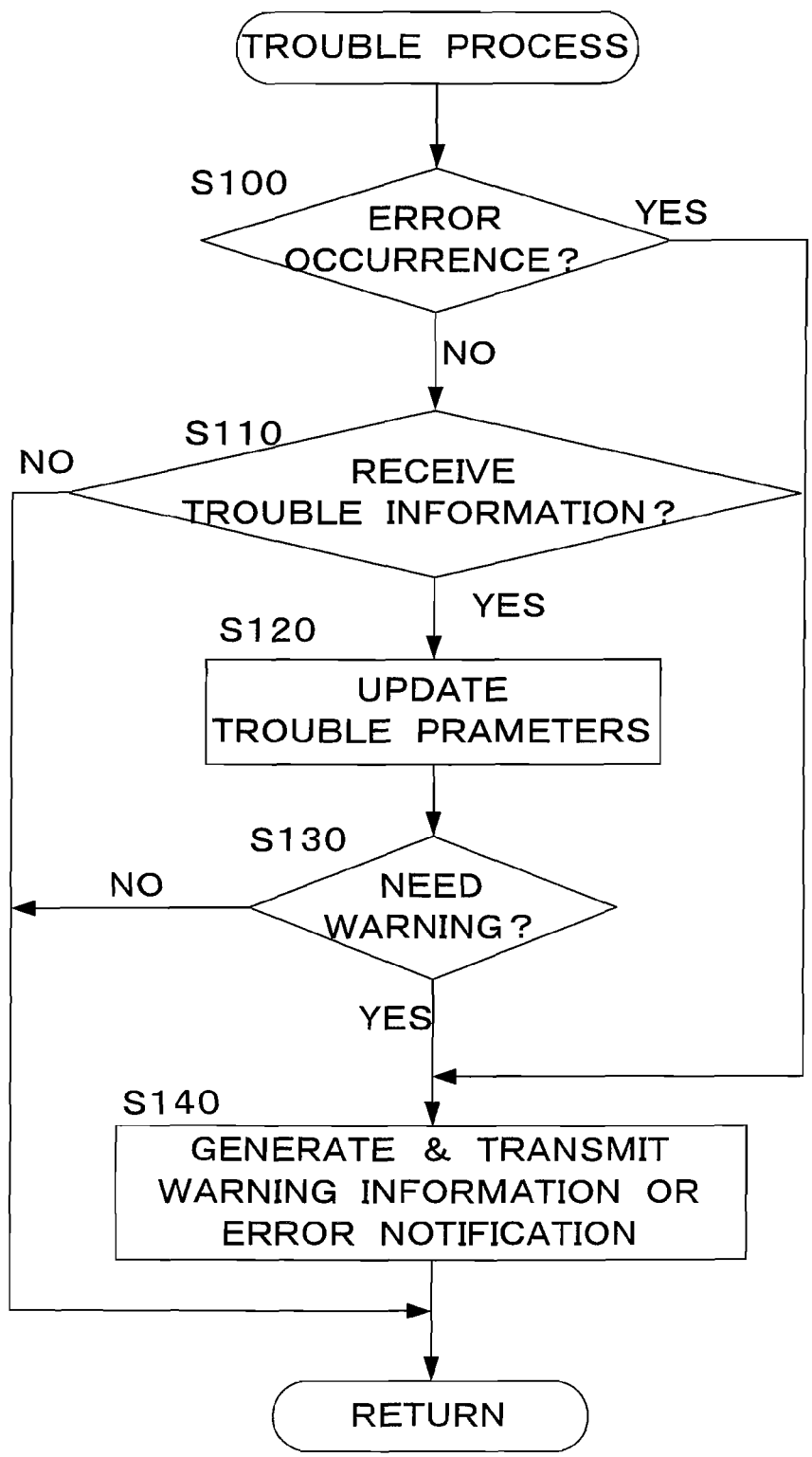

GAME SYSTEM AND REPLACEMENT PART

CROSS-REFERENCE TO PRIOR APPLICATIONS

This is a U.S. national phase application under 35 U.S.C. §371 of International Patent Application No. PCT/JP2005/023725, filed Dec. 26, 2005, which claims the benefit of Japanese Application No. 2005-001633, filed Jan. 6, 2005, both of which are incorporated by reference herein. The International Application was published in Japanese on Jul. 13, 2006 as International Publication No. WO 2006/073075 A1 under PCT Article 21(2).

TECHNICAL FIELD

The present invention relates to a game system and a replacement part used in the game system.

BACKGROUND ART

As a replaceable part provided to a game machine where a predetermined game is performed, there are well known, for example, a self-propelled body such as a vehicle, an animal or the like, and something used for a game body such as a ball and a medal (for example, see Patent Documents 1 to 4).
Patent Document 1: Japanese Patent Application Laid-Open No. 2003-33564
Patent Document 2: Japanese Patent Application Laid-Open No. 2003-38841
Patent Document 3: Japanese Patent Application Laid-Open No. 2003-33567
Patent Document 4: Japanese Patent Application Laid-Open No. 2000-288238

DISCLOSURE OF THE INVENTION

Problem to be Solved by the Invention

However, in the case where the plural game machines exist, because the replacement part is used not only in the game machine in which the replacement part is initially provided but also in other game machines, it is difficult to correctly recognize which replacement part is provided in which game machine only with shipping information and purchasing information. There is no system for confirming in real time in which game machine the replacement part is provided. Accordingly, for example, in the case where a process for maintenance is performed to the specific replacement part, significantly troublesome work is required to search the game machine in which the replacement part is provided, unless the replacement part is provided to the game machine in which the replacement part is initially provided.

In view of the foregoing, an object of the invention is to provide a game system for improving a maintenance property of the game machine in which the replacement part is provided.

Means for Solving the Problem

In order to solve the problem, the present invention provides a game system having a center server and a plurality of game machines capable of transmitting and receiving data to and from the center server through a communication network, said each game machine comprising a game machine main body and a replacement part being replaceable, wherein the replacement part has a part information recording device for recording part identification information which can be obtained by the game machine, the part identification information being uniquely given to each replacement part in the game system, the game machine main body has: a game machine storage device for storing game machine identification information uniquely given to each of the game machines in the game system; a part information obtaining device for obtaining the part identification information recorded in the identification information recording device; and a server transmission device for transmitting to the center server, the part identification information obtained by the part identification information obtaining device together with the game machine identification information stored in the game machine storage device, and the center server has a server storage device for storing the part identification information and the game machine identification information transmitted from the game machine in association with each other.

According to the game system of the present invention, the part identification information uniquely given to the replacement part and the game machine identification information uniquely given to the game machine in which the replacement part is provided are associated with each other to be managed in the center server. Accordingly, it can be collectively managed in which game machine the specific replacement part is provided. Additionally, if the game machine appropriately transmits the obtained part identification information and the game machine identification information of the game machine to the center server to update storage contents of the center server, the latest information on the replacement part provided in the specific game machine can be obtained.

The part information recording device includes a storage medium in which specific information is electrically stored and a recorded medium in which specific information such as a barcode is recorded. Accordingly, the part information obtaining device includes a device for obtaining information from the recorded medium and a device for obtaining the electric information stored in the storage medium.

Moreover, the replacement part of the game system according to the present invention may have: a part information output device for outputting the part identification information recorded in the identification information recording device to the game machine main body; and an information output control device for controlling output time of the part identification information of the part information identification device, and the part information obtaining device of the game machine main body may obtain the part identification information outputted from the part information output device.

Thereby, the part identification information of the replacement part is outputted from the replacement part, and the game machine obtains the outputted part identification information. Moreover, the replacement part can the part identification information in a particular case by using the part output control device. The particular case includes the case in which the game machine main body makes a request for outputting the part identification information and the case of output time which is previously set, e.g., periodically or at the end of the game.

the replacement part may be a self-propelled body, the game machine main body may have a part communication device for transmitting and receiving information on operation of the replacement part to and from the replacement part, the replacement part may have: a game machine communication device for transmitting and receiving information on operation of the replacement part to and from the game machine main body; and an operation control device for controlling the operation of the replacement part based on the information on operation of the replacement part transmitted and received by the game machine communication device.

Thereby, the already-existing game machine communication device can be used as the part output device, and the part communication device can be used as the part information obtaining device.

The game machine further may have a traveling surface, the game part may be the self-propelled body traveling on the traveling surface, and the part identification information may be motor identification information which is uniquely given to a motor provided in the mobile body. Thereby, the present invention can be applied to the competition game in which the mobile bodies travel to carry on competition.

The replacement part may have a status information storage device for storing status information indicating a status of the replacement part, the part information output device may output the status information together with the part identification information, the part information obtaining device of the game machine main body may obtain the status information together with the part identification information, the server transmission device may transmit to the center server, the status information together with the part identification information and the game machine identification information, and the server storage device of the center server further may store the status information in association with the part identification information. Thereby, also the status information on the replacement part can be collectively managed in the center server.

In the game system according to the present invention, a maintenance server may be further provided to transmit and receive data to and from the center server, the center server may copy storage contents of the server storage device into a maintenance storage device of the maintenance server, and the maintenance server may generate maintenance information on maintenance of the replacement part based on the part identification information, the game machine identification information, and the status information, which are stored in the maintenance storage device. Thereby, because the information on the maintenance of the replacement part is managed by the maintenance server, it is not necessary to use the center server with respect to the maintenance of the replacement part. Accordingly, the center server can be used as a server dedicated to the game, the load on the center server can be reduced, and the line congestion can be avoided.

In order to solve the problem, the present invention provides a replacement part replaceably provided in each of a plurality of game machines, each of the game machines capable of transmitting and receiving data to and from a center server through a communication network, wherein the replacement part has a part information recording device for recording part identification information which can be obtained by game machine, the part identification information for identifying the replace part from the other replacement part. By using the replacement part, the game system of the invention can be realized.

Effect of the Invention

As described above, the replacement part provided in the game machine has the part information recording device in which the part identification information uniquely given to the replacement part is recorded, the game machine obtains the part identification information from the part information recording device to transmit to the center server, the part identification information together with the game machine identification information uniquely given to the game machine, and the center server manages the part identification information and the game machine identification information transmitted from the game machine in association with each other. Thereby, the present invention can provide the game system for improving the maintenance property of the game machine in which the replacement part is provided.

BRIEF DESCRIPTION OF THE DRAWINGS

FIG. 12 is a diagram showing an example of a list generated by a maintenance server in the trouble notification system shown in FIG. 10;

FIG. 13 is a diagram showing another example of the list generated by the maintenance server in the trouble notification system shown in FIG. 10;

FIG. 14 is a diagram showing another example of the list generated by the maintenance server in the trouble notification system shown in FIG. 10; and FIG. 15 is a flowchart showing a trouble process performed in chassis.

BEST MODE FOR CARRYING OUT THE INVENTION

Figure 1:
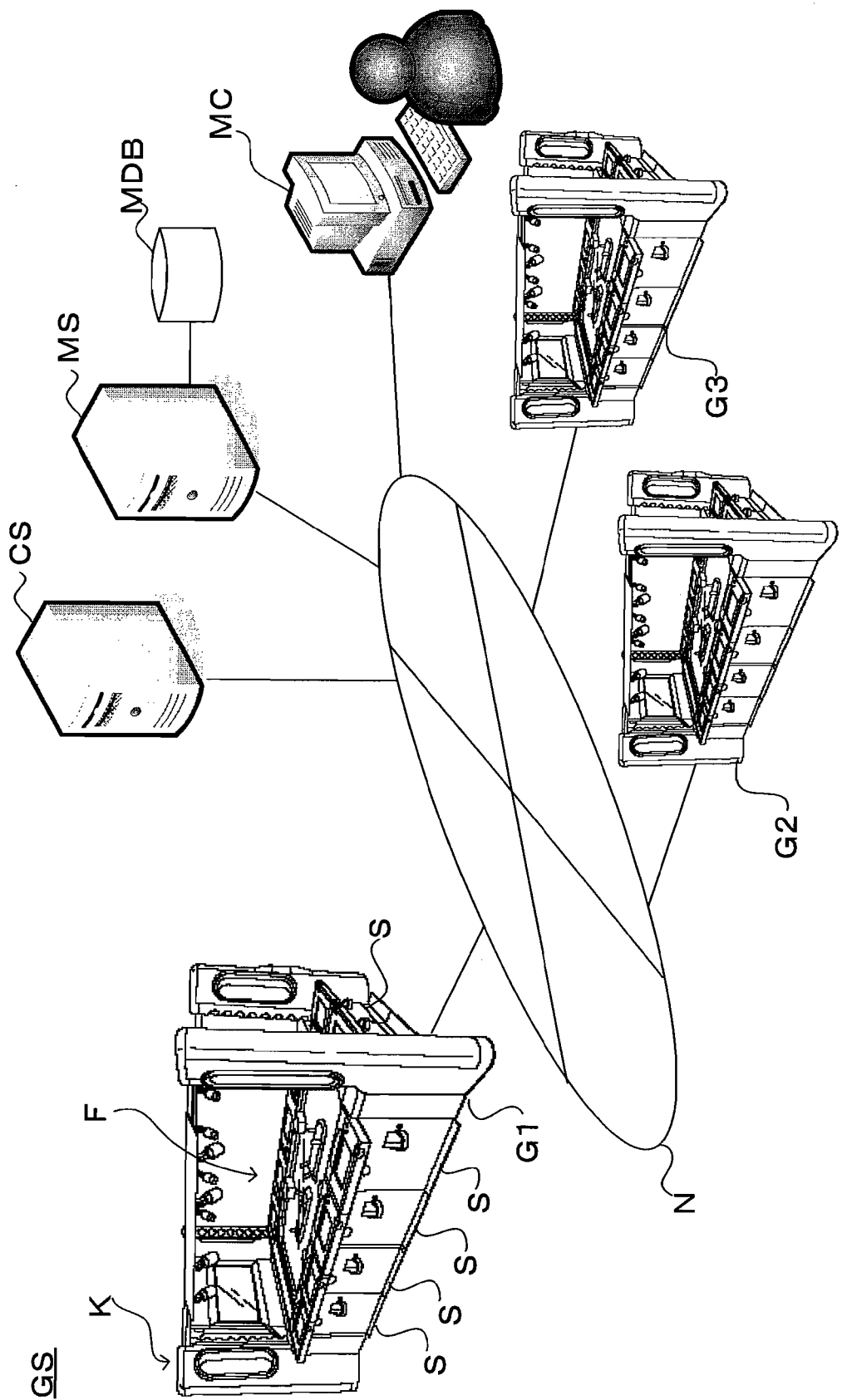
FIG. 1 shows an embodiment of a game system according to the present invention.

FIG. 1 is a diagram showing a schematic configuration of a game system GS according to an embodiment of the invention. The game system GS includes plural game machines G1, G2, and G3, a center server CS, a maintenance server MS, and a maintenance client MC. The game machines G1 to G3, the servers CS, MS and the client MC are connected to one another through a communication network N. The plural game machines G1 to G3 in the game system GS have the same configuration. Accordingly, each of the plural game machines G1 to G3 is referred to as "the game machine G" at the moment when the distinction is not needed. Although the three game machines G are shown in FIG. 1, the number of game machines G included in the game system GS is not limited to this embodiment.

The center server CS mainly processes data concerning a game according to a request of the game machine G. The maintenance server MS stores data concerning the maintenance such as error log information on the game system GS in a maintenance storage unit MDB which is a storage unit of the maintenance server MS, and the maintenance server MS manages the data concerning the maintenance. The maintenance client MC is installed in a maintenance service division which collectively manages the maintenance of the game system GS, the maintenance client MC performs analysis and study of the maintenance of the game system GS by using the data stored in the maintenance storage unit MDB. The Internet is used as the communication network N. The game machine G is a commercial game machine which is installed in a game arcade or a store having a game corner. A field F where the game is played is provided in a chassis K which is of a game machine main body of the game machine G, and plural stations S, . . . , S which receive operations of players are arranged around the field F.

Figure 2:
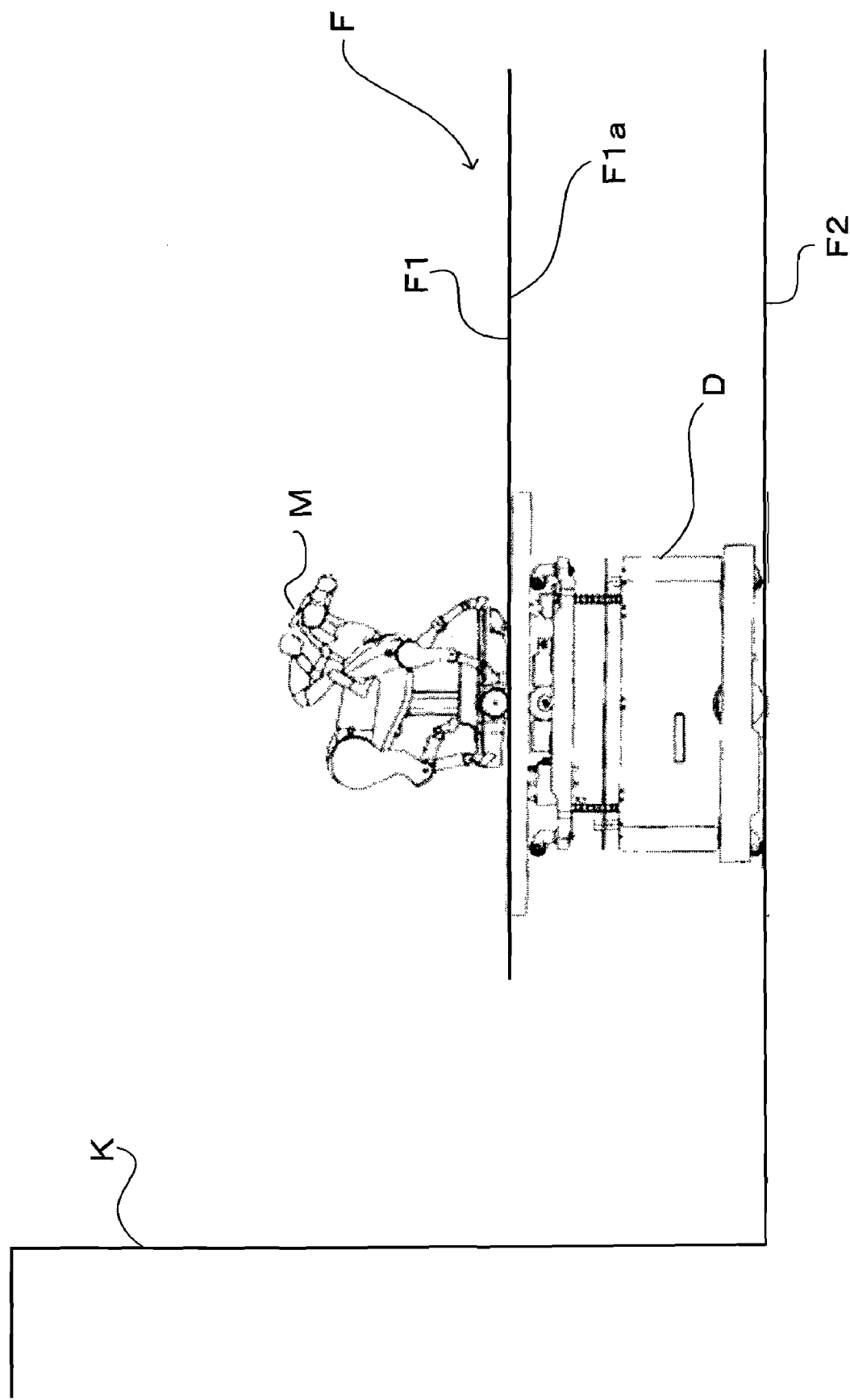
FIG. 2 shows a self-propelled body provided in a game machine shown in FIG. 1.

As shown in FIG. 2, the field F has an upper traveling-field F1 and a lower traveling-field F2. A self-propelled body D as a replaceable part and a game part is provided on the lower traveling-filed F2, and the self-propelled body D is connected to a model body M through the upper traveling filed F1 by the magnetic force. A line guided competition game is performed in the game machine G. In the line guided competition game, the plural self-propelled bodies D travel while tracking guide lanes provided on the lower traveling-field F2, and thereby each of the self-propelled bodies D pulls the corresponding model body M. In this embodiment, the model body M is a model horse, and the line guided competition game is performed as a horse race with six model horses. The line guided competition race progresses by data transmission and reception performed between the self-propelled body D and the chassis K. In this embodiment, infrared ray is used as a carrier wave of the data transmission and reception. Each of the chassis K and the self-propelled body D controls the operation of itself based on the received data. A conventional method may be employed as the control method.

A backside F1a of the upper traveling-field F1 is the power supply surface in which a power supply line for supplying electric power to the self-propelled body D is provided. Hereinafter the line guided competition game performed in the game machine G is simply referred to as "the game" or "the race". A participant of the game is referred to as "the player", and a person who provides the game machine G to the player or a person who manages the maintenance of the game machine are collectively referred to as "the user". Schematic configurations of the center server CS, the chassis K, and the self-propelled body D will be described below.

Figure 3:
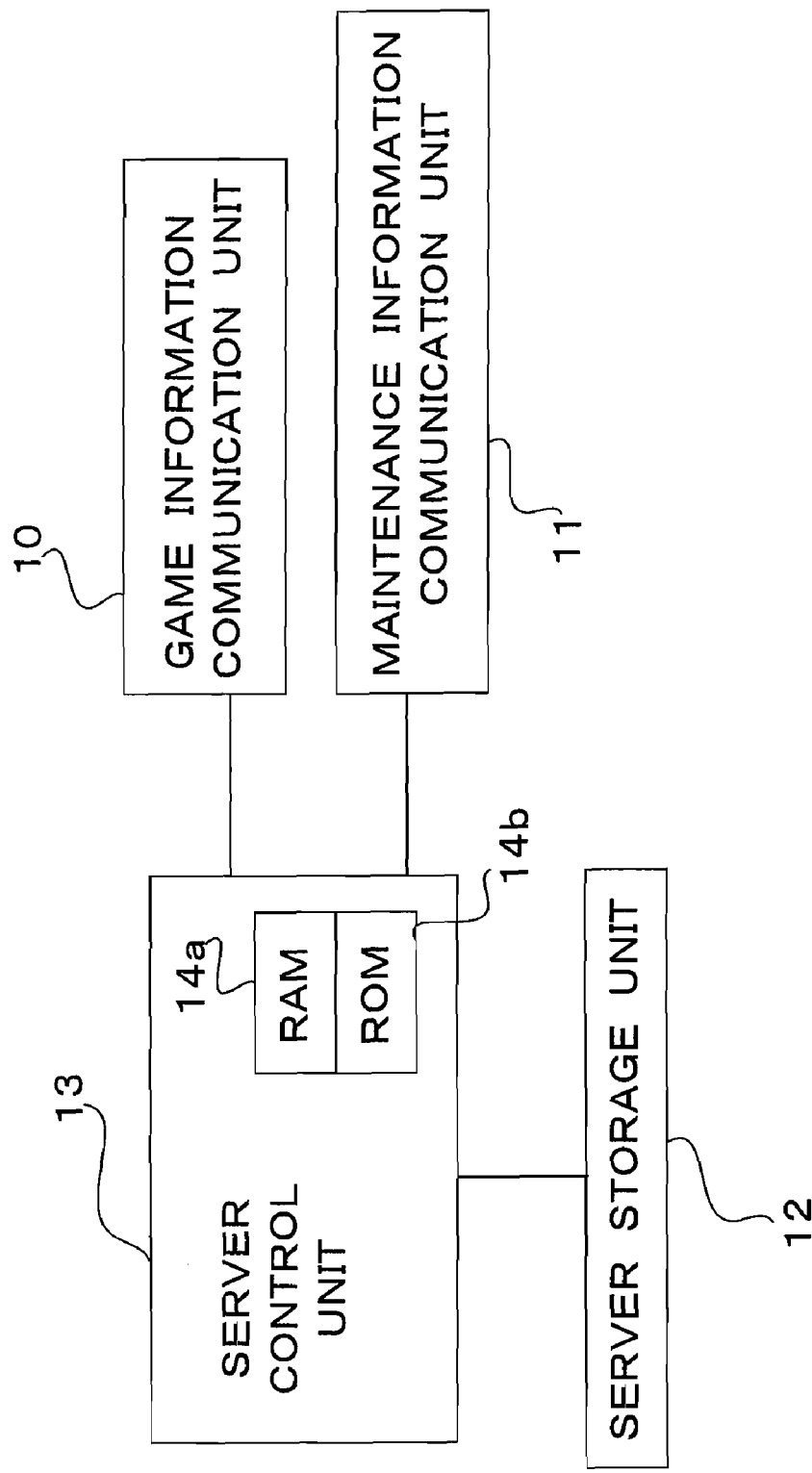
FIG. 3 is a diagram showing a schematic configuration of a center server.

The schematic configuration of the center server CS will be described with reference to FIG. 3. The center server CS has a game information communication unit 10 which transmits and receives various pieces of information to and from the game machine G, a maintenance information communication unit 11 which transmits information on the maintenance to the maintenance server MS, a server storage unit 12 which comprises a rewritable nonvolatile storage memory, and a server control unit 13 which controls the operation of each configuration provided in the center server CS. The server control unit 13 may be a computer including a CPU and various peripheral circuits such as a RAM 14a and a ROM 14b which are necessary for the CPU's operation.

Figure 4:
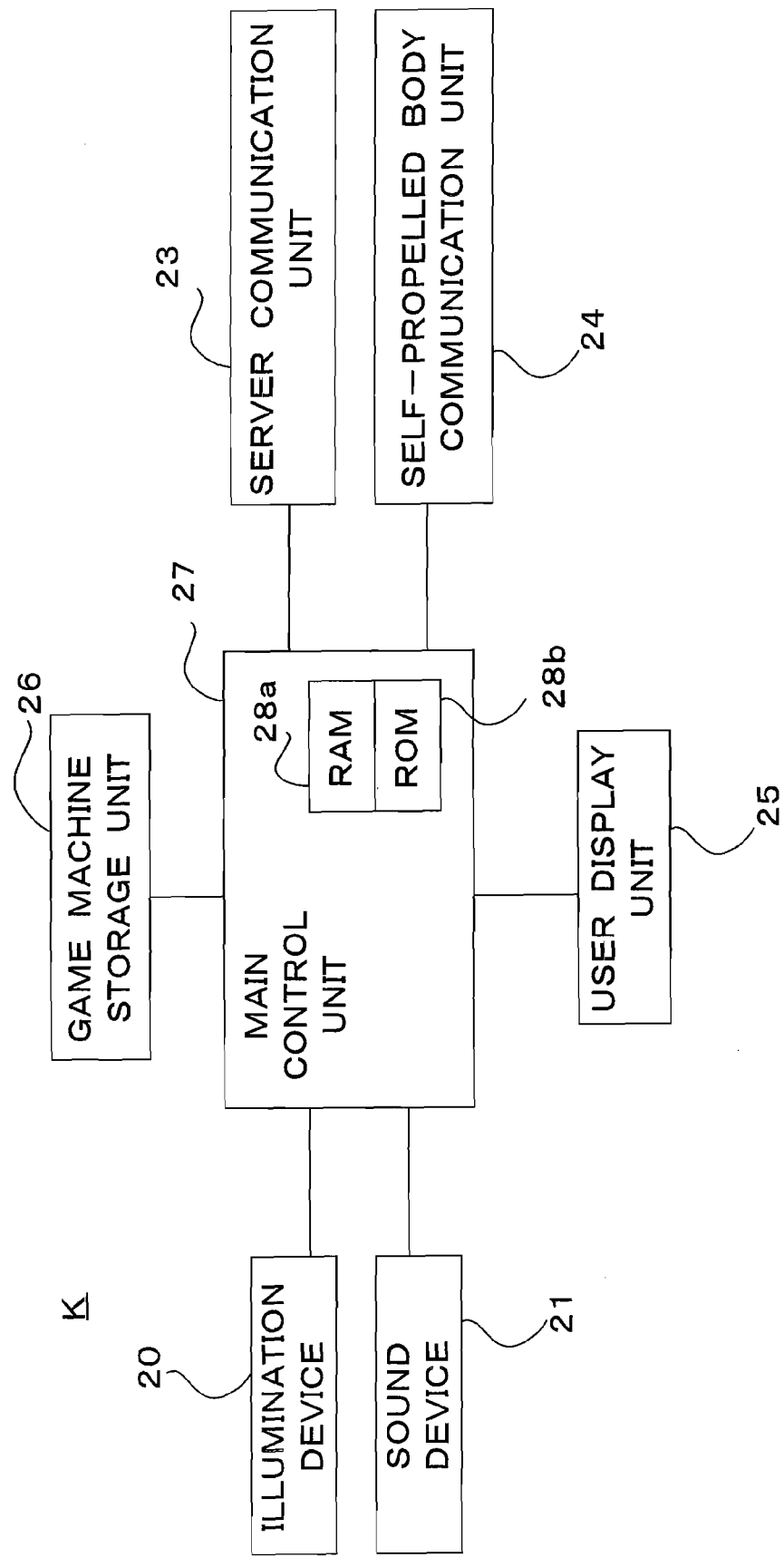
FIG. 4 is a diagram showing a schematic configuration of a chassis.

The schematic configuration of the chassis K will be described with reference to FIG. 4. The chassis K includes an illumination device 20 and a sound device 21 which are used for enliving the game, a server communication unit 23 which transmits and receives various pieces of information to and from the center server CS, a self-propelled body communication unit 24 as a communication device which transmits and receives various pieces of information to and from the self-propelled body D, a user display unit 25 on which various pieces of information are displayed to the user, a game machine storage unit 26 which comprises the rewritable non-volatile storage memory, and a main control unit 27 which controls the operations of the configurations provided in the game machine G. The main control unit 27 may be a so-called personal computer including a CPU and various peripheral circuits such as a RAM 28a and a ROM 28b which are necessary for the CPU's operation.

A program necessary for the operation of the chassis K and a game machine ID are stored in the ROM 28b. The game machine ID is game machine identification information which is uniquely given to each game machine G in the game system GS. Thereby, the ROM 28b functions as the game machine storage device. Any display unit on which various pieces of information can be recognized by the user may be used as the user display unit 25, and the user display unit 25 includes a monitor, a printer and the like. Various pieces of data such as a D code are stored in the game machine storage unit 26. The D code is uniquely given in the game system GS to a store where the game machine G is installed. Furthermore, to the main control unit 27, a device (not illustrated) for transmitting and receiving data from and to each station S, and a player display unit (not illustrated) for providing information concerning of the game to the players through a large screen are connected.

Figure 5:
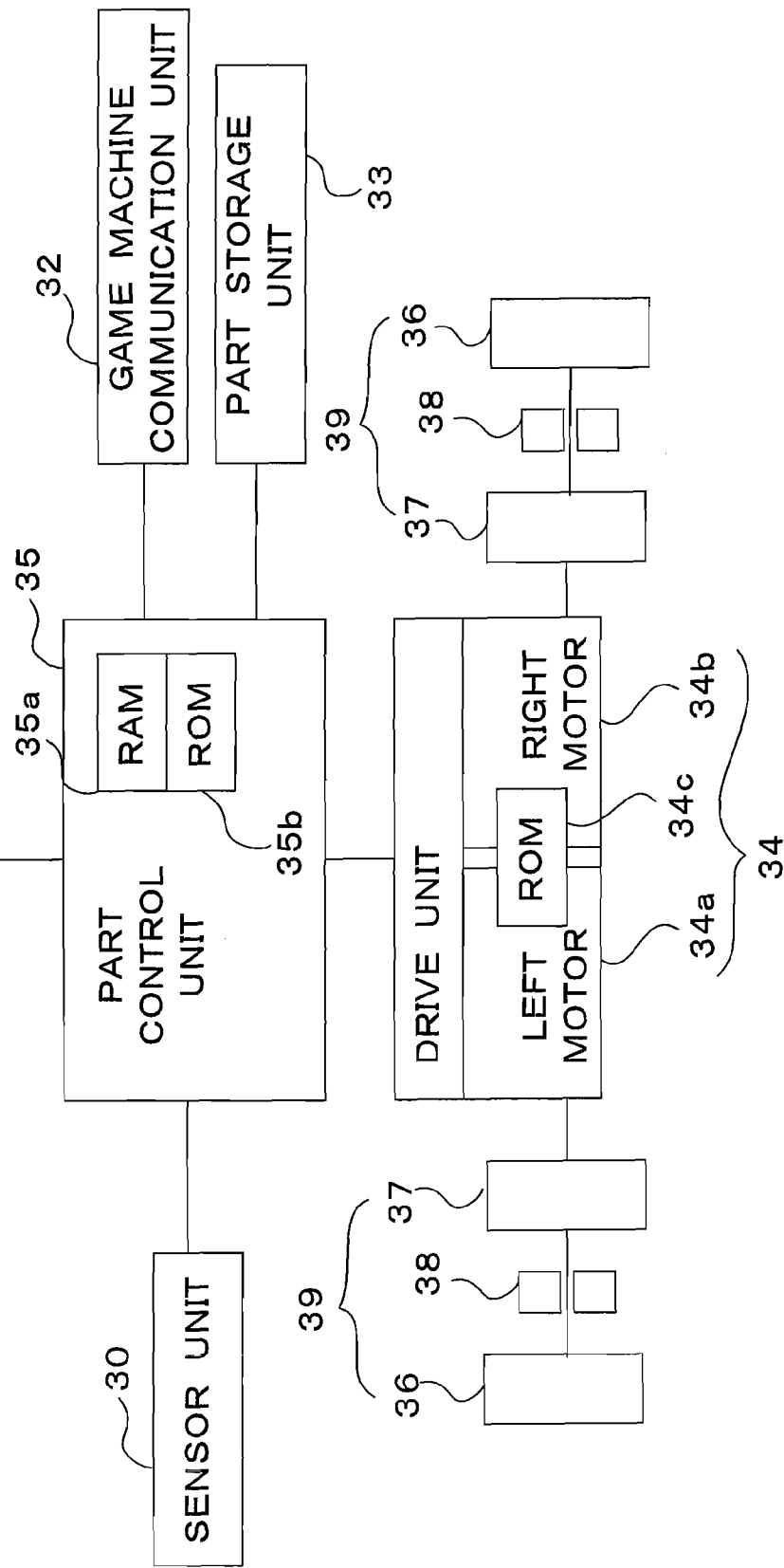
FIG. 5 is a diagram showing a schematic configuration of the self-propelled body.

The schematic configuration of the self-propelled body D will be described with reference to FIG. 5. The self-propelled body D includes a sensor unit 30 which includes various sensors for detecting operations of the self-propelled body D, a power supply unit 31 which supplies the electric power, a part storage unit 33 which comprises the rewritable nonvolatile storage medium, a drive unit 34 which comprises a motor unit, a game machine communication unit 32 as a part information output device and a game machine communication device for transmitting and receiving various pieces of information to and from the game machine G, and a part control unit 35 as an operation control device for controlling the operations of the various configurations provided in the self-propelled body D. The motor unit 34 includes a left motor 34a and a right motor 34b. Tires 36 are connected to motors 34a and 34b through gear mechanisms 37 respectively, and a bearing 38 is provided in a shaft of the tire 36 to support the shaft.

A motor ROM 34c is further provided in the motor unit 34, and a motor ID is stored in the motor ROM 34c. The motor ID is motor identification information which is uniquely given in the game system GS to the motor unit 34. The motor ID and the self-propelled body D correspond to each other one by one, and the motor ID is used as a self-propelled body ID for identifying the self-propelled body D in the game system GS. Thereby, the motor ID functions as a part identification information, and the motor ROM 34c functions as a part information recording device or apart identification information storage device. In this embodiment, the tire 36 and the gear mechanism 37 constitute a gear unit 39.

A sensor for position control of the self-propelled body D, a sensor for operation control, and the like are provided in the sensor unit 30. Each sensor will be described later. Various pieces of data such as status parameters and trouble parameters which are used in the later-mentioned process are stored in the part storage unit 33. Thereby, the part storage unit 33 functions as a status information storage device. The data stored in the part storage unit 33 will be described in detail later. The part control unit 35 includes a CPU and various peripheral circuits such as a RAM 35a and a ROM 35b which are necessary for the CPU's operation. As described above, because the race is performed with the six model horses, the six self-propelled bodies D having the same configuration are provided in one game machine G.

A status confirmation system, a replacement time notification system, and a trouble notification system which are performed in the game system will sequentially be described below. In each process described below, processes performed in the self-propelled body D are controlled by the part control unit 35, processes performed in the chassis K are controlled by the main control unit 27, and processes performed in the center server CS are controlled by the server control unit 13.

Figure 6:
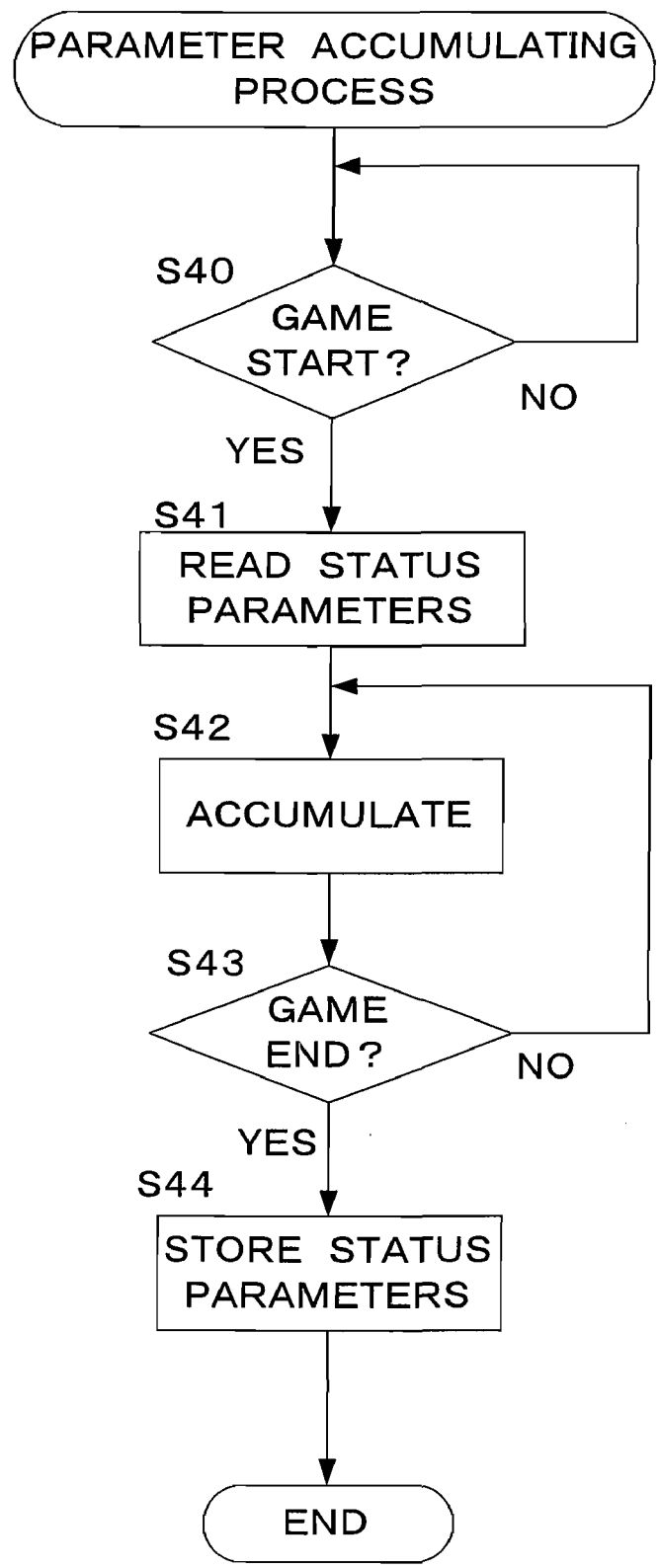
FIG. 6 is a flowchart showing a parameter accumulating process performed in the self-propelled body.

A parameter accumulating process performed during the game will be described with reference to a flowchart of FIG. 6. The parameter accumulating process is a process of updating values of status parameters indicating the status of the self-propelled body D, and the parameter accumulating process is performed by the part control unit 35 of the self-propelled body D. The status parameters include, for example, a motor operating time MH indicating a total operating time of the motor unit 34, a gear operating time GH indicating a total operating time of the gear unit 39, the number of motor revolutions MR which is of the total number of motor revolutions of each of the motors 34a and 34b, and a travel distance RD. Hereinafter the mentioned status parameters are collectively referred to as "the status parameters". The status parameters are stored in the part storage unit 33. First, the part control unit 35 determines whether or not the situation is a game start until the part control unit 35 determines that the situation is the game start (Step S40). In the case where start information indicating the game start is transmitted from the chassis K and the self-propelled body D receives the start information, the part control unit 35 determines that the situation is the game start.

When determining that the situation is the game start, the part control unit 35 reads the status parameters from the part storage unit 33 (Step S41). After the status parameters are read, the value of each status parameter is accumulated according to the operation of the self-propelled body D in the game (Step S42). Specifically, the operation of the motor unit 34 is detected by the motor operating sensor, the duration of detecting the operation is measured and added to the motor operating time BH, and thereby the motor operating time BH is obtained. The operation of the gear unit 39 is detected by the gear operating sensor, the duration of detecting the operation is measured and added to the gear operating time GH, and thereby the gear operating time GH is obtained.

The revolutions of the motors 34a and 34b are detected by the motor revolution sensor, the number of revolutions is counted and added to the number of motor revolutions MR while the revolution is detected, and thereby the number of motor revolutions MR is obtained. The travel distance RD is obtained from the number of motor revolutions MR. Thereby, the status parameters function as the parameters indicating the used amount of the game part. By step S42, the part control unit 35 functions as a measurement device and an accumulation device. The part control unit 35 includes a counter and a timer to function as the measurement device.

After the game starts, the part control unit 35 determines whether or not the situation is a game end until the part control unit 35 determines that the situation is the game end (Step S43). In the case where end information indicating the game end is transmitted from the chassis K and the self-propelled body D receives the end information, the part control unit 35 determines that the situation is the game end. When determining that the situation is the game end, the part control unit 35 stores the status parameters updated during the game in the part storage unit 33 to end the parameter accumulating process (Step S44).

Figure 7:
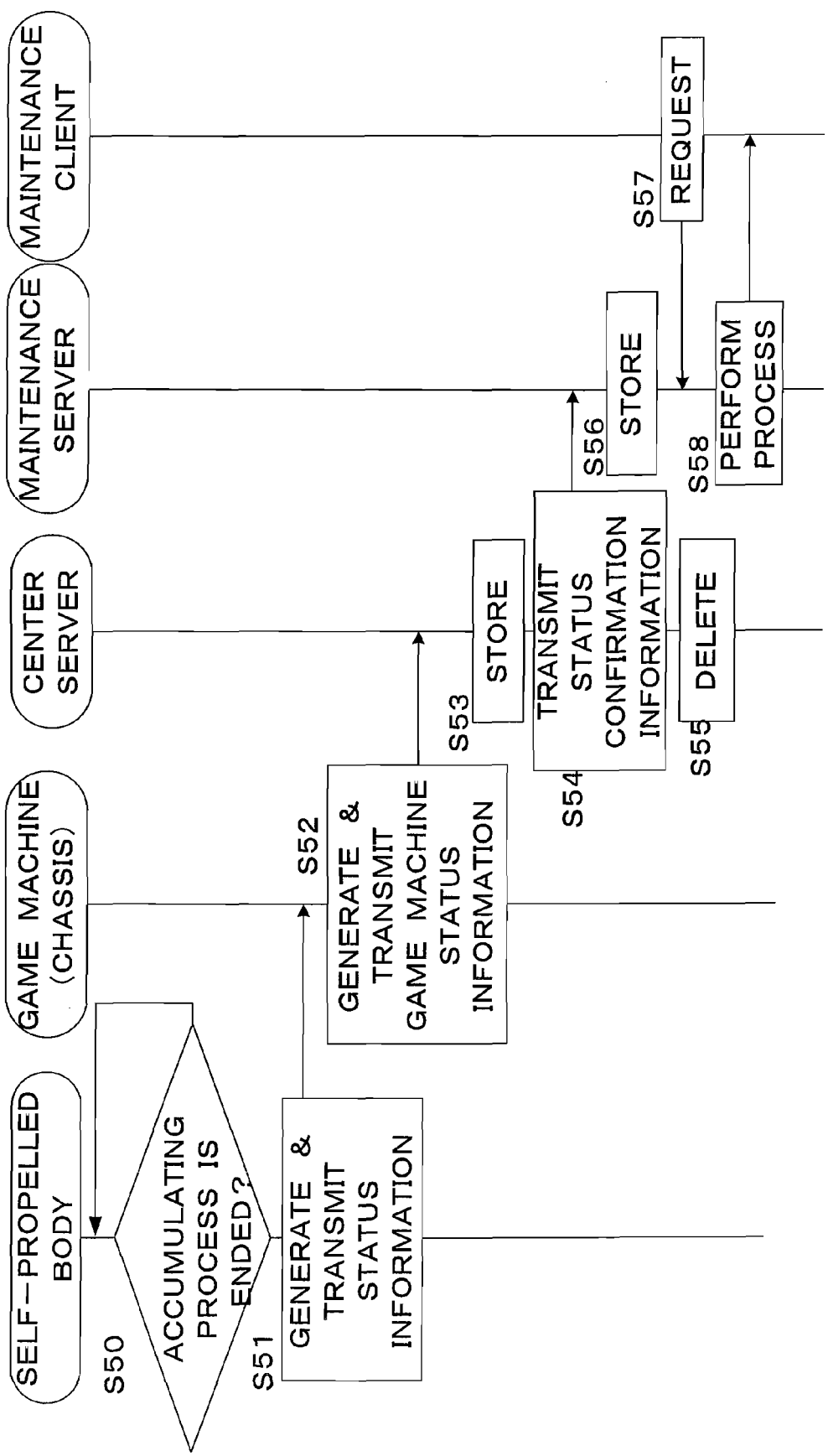
FIG. 7 is a sequence diagram showing a status confirmation system performed in the game system shown in FIG. 1.

The status confirmation system performed after the parameter accumulating process will be described with reference to the sequence diagram of FIG. 7. The status confirmation system is a system for enabling to confirm to which game machine G in the game system GS a specific self-propelled body D is provided and what the status of the specific self-propelled body D is like. Hereinafter the confirmation of the game machine G to which the self-propelled body D is provided and the confirmation of the status of the self-propelled body D are referred to as the "status confirmation". The part control unit 35 determines whether or not the parameter accumulating process is ended in the self-propelled body D (Step S50). Thereby, the part control unit 35 functions as an information output control device. When the part control unit 35 determines that the parameter accumulating process is ended, the self-propelled body D generates status information including the self-propelled body ID of itself being correlated with the status parameters stored in the part storage unit 33, and the status information is transmitted to the chassis K through the game machine communication unit 32 (Step S51). Thereby, the part control unit 35 and the game machine communication unit 32 function as a part information output device.

When the chassis K receives the status information from the self-propelled body D through the self-propelled body communication unit 24, the chassis K generates game machine status information in which the game machine ID of the self-propelled body D is correlated with the received status information, and the chassis K transmits the game machine status information to the center server CS through the server communication unit 23 (Step S52). Thereby, the self-propelled body communication unit 24 functions as a part information obtaining device, and the server communication unit 23 functions as the server transmission device. For example, the chassis K transmits the game machine status information, in which the game machine ID of the chassis K is correlated with the accumulated status information received from all the self-propelled bodies D provided to the chassis K, to the center server CS.

The center server CS stores the received game machine status information in the server storage unit 12 (Step S53). That is, both of the status parameters correlated with the game machine ID and the self-propelled body ID are stored in the server storage unit 12. When the status information correlated with the game machine ID included in the received game machine status information has already existed in the server storage unit 12, the status information existing in the server storage unit 12 is updated by the status information of the received game machine status information. The center server CS transmits to the maintenance server MS periodically, e.g., at the fixed time every day, the data as the status confirmation information obtained by copying the game machine status information stored in the server storage unit 12 (Step S54).

The center server CS deletes the game machine status information, which is transmitted to the maintenance server MS, from the server storage unit 12 (Step S55). The maintenance server MS stores the received status confirmation information in the maintenance storage unit MDB (Step S56). When the maintenance client MC makes a request about the status confirmation information to the maintenance server MS as appropriate (Step S57), the maintenance server MS performs a process corresponding to the request based on the status confirmation information stored in the maintenance storage unit MDB (Step S58). Examples of the process corresponding to the request include a process of displaying the status confirmation information on the display device of the maintenance client MC in the form of a list, a process of down-loading the status confirmation information to the maintenance client MC, and various processes of analyzing the status confirmation information. In the game system GS, the type of the status parameter is recognized by, e.g., a status code corresponding to each status parameter.

Figure 8:
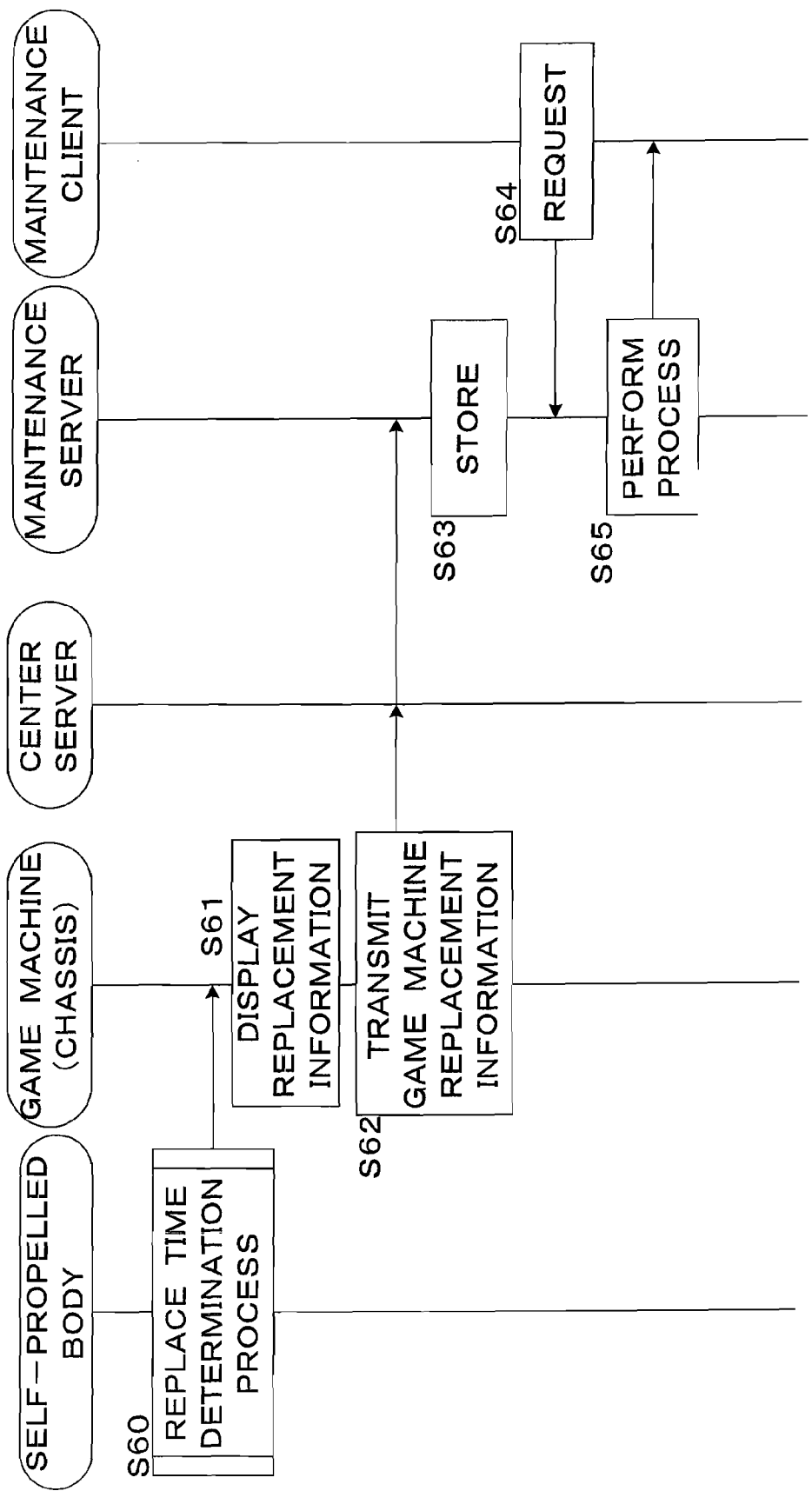
FIG. 8 is a sequence diagram showing a replacement time notification system performed in the game system shown in FIG. 1.

The replacement time notification system performed after the parameter accumulating process will be described with reference to the sequence diagram of FIG. 8. The user can appropriately be notified of the replacement time to replace the consumable item included in the self-propelled body D by the replacement time notification system. Examples of the consumable item of the self-propelled body D include the gear unit 39, the bearing 38, a power supply pin, and a brush, and so on. In this embodiment, the gear unit 39 and the bearing 38 will be described. A replacement time determination process is performed in the self-propelled body D (Step S60). When the part control unit 35 determines that it is the replacement time in the replacement time determination process, the replacement information is transmitted from the self-propelled body D to the chassis K. The replacement time determination process will be described later. The replacement information includes the self-propelled body ID and consumable item information indicating a replacing object, as described later.

The replacement information transmitted from the self-propelled body D is received by the chassis K. Thereby, the self-propelled body communication unit 24 functions as a replacement information obtaining device. The chassis K displays contents of the obtained replacement information on the user display unit 25 (Step S61), and the chassis K transmits to the center server CS through the server communication unit 23, the game machine replacement information in which the game machine ID of the chassis K is correlated with the replacement information (Step S62). Thereby, the main control unit 27 functions as a replacement processing device. In the chassis K, the replacement information may be displayed according to a display request operation of the user, or the reception of the replacement information from the self-propelled body D may be used as a trigger to display the replacement information. The center server CS transmits the received game machine replacement information to the maintenance server MS. The maintenance server MS stores the received game machine replacement information in the maintenance storage-unit MDB (Step S63). That is, the consumable item information correlated with the game machine ID and the self-propelled body ID is stored in the maintenance storage unit MDB.

When the maintenance client MC makes a request about the replacement information (Step S64), the maintenance server MS performs a process corresponding to the request based on the game machine replacement information stored in the maintenance storage unit DB (Step S65). Examples of the request about the replacement information include the display of the list of the replacement information and the analysis and study of the status information according to the replacement information, and so on. Therefore, for example, a user of a maintenance division causes the maintenance client MC to display the list of the replacement information to be able to confirm which consumable item in which game machine G is in a state of the replacement time. At the moment of replacing the consumable items, the user resets to an initial, the status parameter, such as the travel distance RD, to be used to compute the replacement parameter indicating a wearing level of the replaced consumable item.

Figure 9:
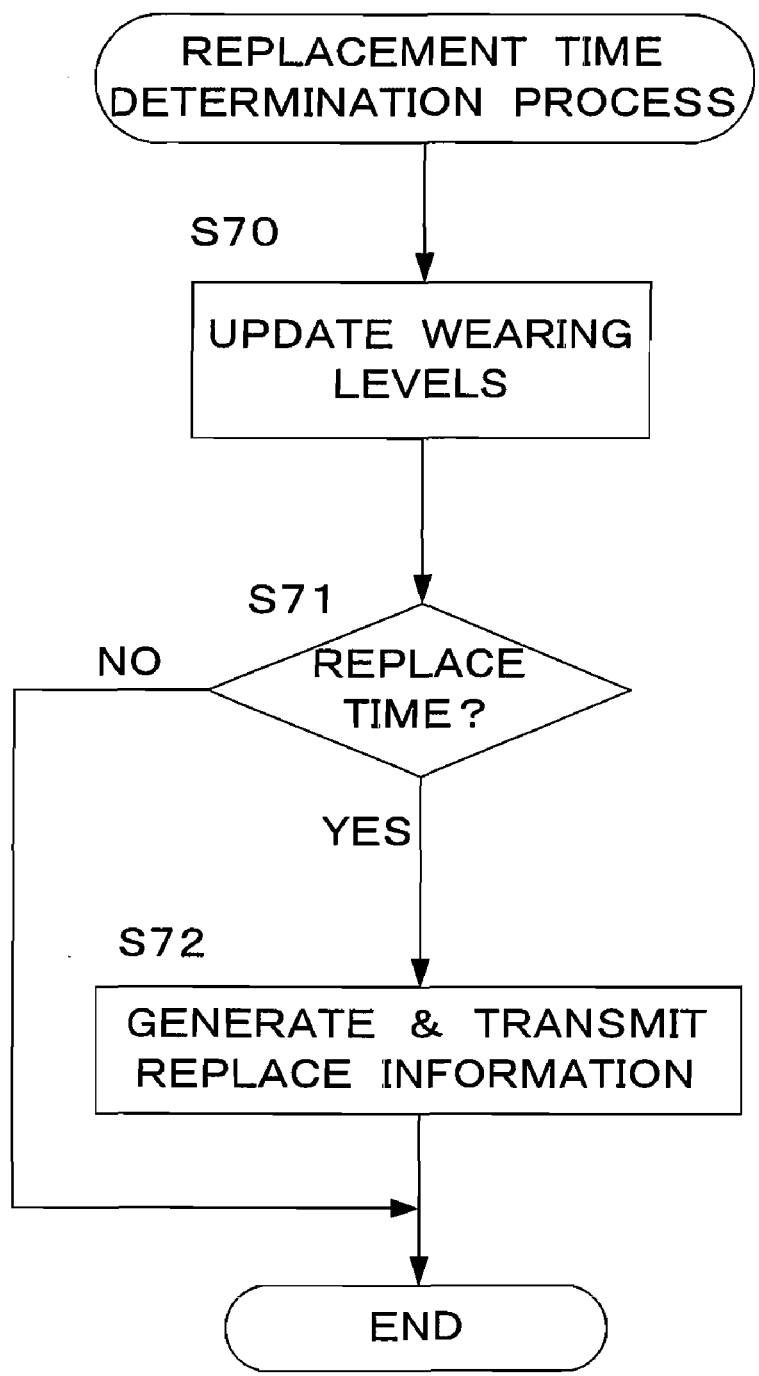
FIG. 9 is a flowchart showing a replacement time determination process performed in the self-propelled body.

The replacement time determination process performed in the self-propelled body D will be described with reference to the flowchart of FIG. 9. The part control unit 35 updates a replacement parameter 1 indicating the wearing level of the gear unit and a replacement parameter 2 indicating the wearing level of the bearing based on the values of the status parameters stored in the part storage unit 33 (Step S70). For example, in this embodiment, each of the replacement parameters 1 and 2 is set equal to the value of the travel distance RD. From Step S70, the part control unit 35 functions as a wearing level specifying device.

Then, the part control unit 35 determines whether or not it is the replacement time to replace the gear unit 39 and the bearing 38 based on the replacement parameters 1 and 2 (Step S71). Specifically, a criterion wearing level 1 indicating the replacement time of the gear unit 39 is checked against the value of the replacement parameter 1, and a criterion wearing level 2 indicating the replacement time of the bearing 38 is checked against the value of the replacement parameter 2. When the values of the replacement parameters 1 and 2 exceed the values of the corresponding criterion wearing levels 1 and 2, the part control unit 35 determines that it is the replacement time. Thereby, the part control unit 35 functions as a replacement determination device. Value of the travel distance RD indicating the replacement time of each of the consumable items 38 and 39 is set to each of the criterion wearing levels 1 and 2, and the criterion wearing levels 1 and 2 are stored in the part part storage unit 33 while correlated with the consumable items 38 and 39 respectively. Thereby, the part storage unit 33 functions as the criterion storage device. The values of the criterion wearing levels 1 and 2 can be set by a previously performed durability test.

When the part control unit 35 determines that it is the replacement time to replace the consumable item, the replacement information is generated and transmitted from the game machine communication unit 32 to the chassis K (Step S72). Thereby, the game machine communication unit 32 functions as replacement information output device. The replacement information includes the self-propelled body ID of the self-propelled body D and the consumable item information. In Step S71, when the part control unit 35 determines that it is not the replacement time, the replacement time determination process is ended.

Figure 10:
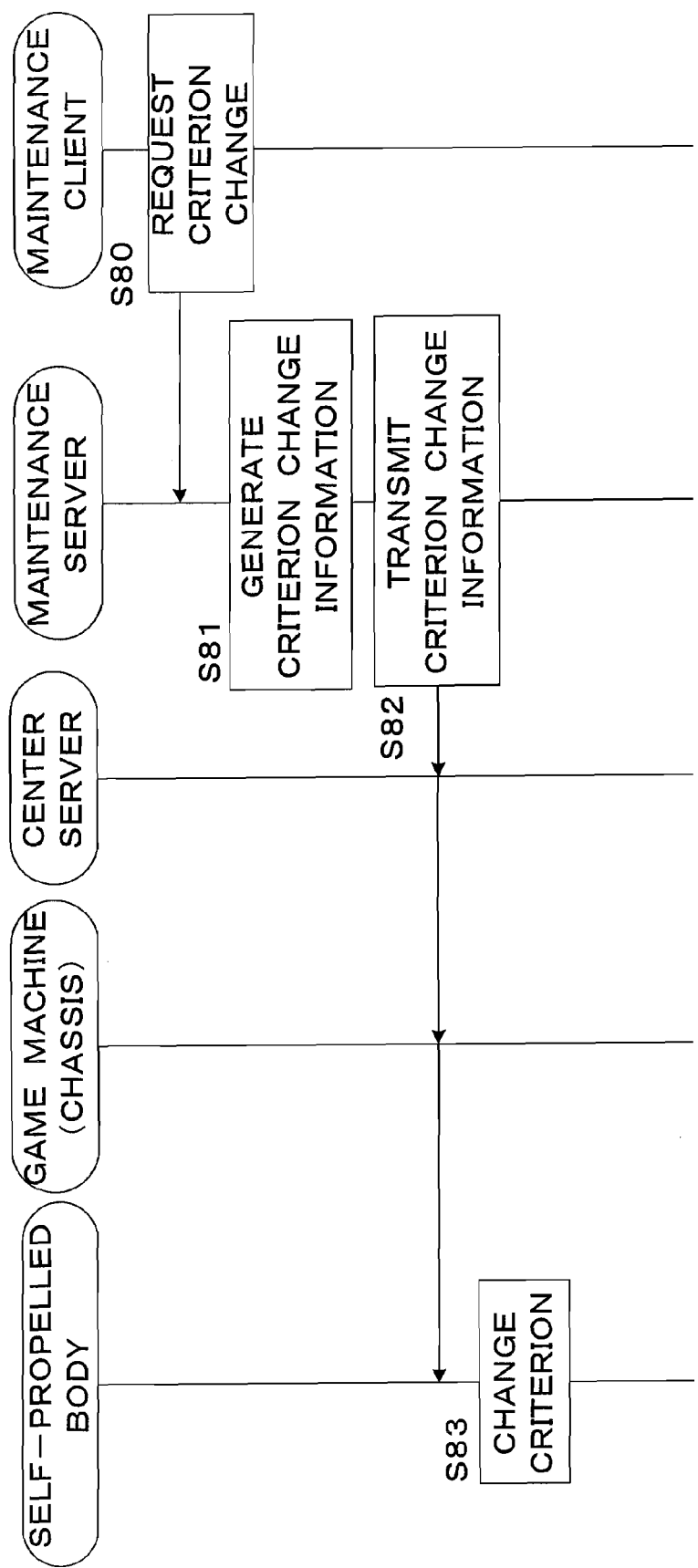
FIG. 10 is a sequence diagram showing a criterion wearing level changing system performed in the game system shown in FIG. 1.

In the game system GS, a criterion wearing level changing system which can change the criterion wearing level possessed by the self-propelled body D can be also realized by operation from the maintenance client MC. The criterion wearing level changing system will be described with reference to the sequence diagram of FIG. 10. In this embodiment, the case in which the criterion wearing level 1 of the gear unit 39 is changed will be described. A process (a criterion change request) for changing the value of the criterion wearing level 1 of the gear unit 39 is performed by the user from the maintenance client MC to the maintenance server MS (Step S80). In the maintenance server MS, criterion change information including the changed value of the criterion wearing level 1 is generated (Step S81), and the criterion change information is transmitted to the center server CS (Step S82). The center server CS transmits the received criterion change information to each chassis K.

The chassis K which received the criterion change information from the center server CS transmits the criterion change information to each self-propelled body D. Thereby, the main control unit 27 and the self-propelled body communication-unit 24 function as a change information output device. In the self-propelled body D which receives the criterion change information through the game machine communication unit 32 as a change information obtaining device, the value of the criterion wearing level 1 stored in the part storage unit 33 is updated to the value of the criterion wearing level 1 included in the received criterion change information (Step S83). Thereby, the criterion wearing level 1 possessed by the self-propelled body D is changed to the value requested for changing to by the user to the maintenance client MC. From Step S83, the part control unit 35 functions as the criterion change device. The similar process is performed to change the criterion wearing level 2 of the bearing 38. In the game system GS, the type of the consumable item and the type of the criterion wearing level which are indicated by the consumable item information are recognized by codes respectively.

Figure 11:
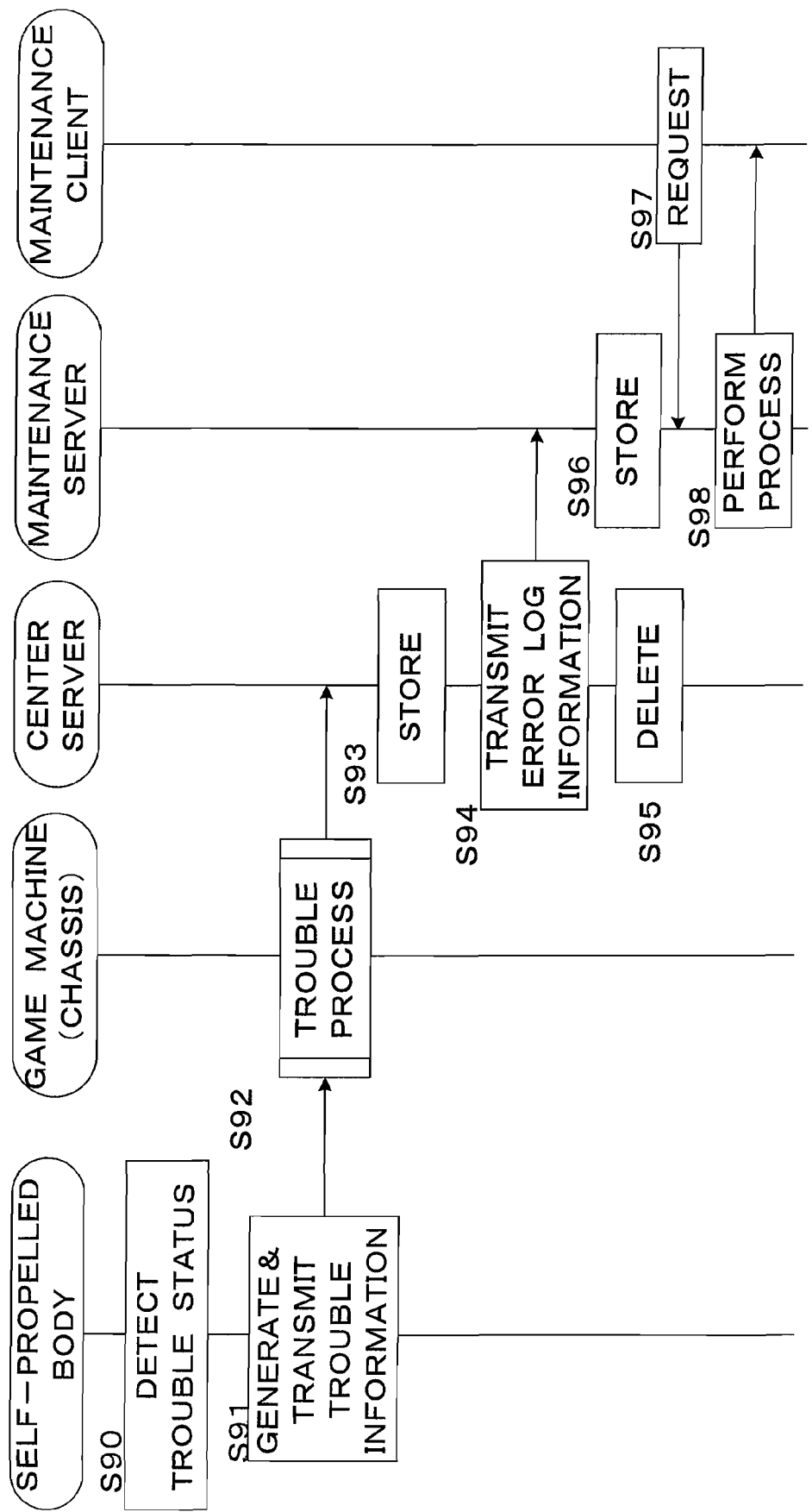
FIG. 11 is a sequence diagram showing a trouble notification system performed in the game system shown in FIG. 1.

Finally, the trouble notification system will be described with reference to the sequence diagram of FIG. 11. The trouble notification system is a system which notifies the user of a trouble status of the game machine G. Each sensor of the self-propelled body D detects the trouble status during the game (Step S90). When the trouble status is detected, the part control unit 35 generates trouble information including the detected trouble status and the self-propelled body ID of the self-propelled body D and the part control unit 35 transmits the trouble information to the chassis K (Step S91). Examples of the trouble status include out of line, overturn, move delay, power failure, and so on. For example, the trouble information indicating the out of line when a line sensor detects that the self-propelled body D runs out of the course, and the trouble information indicating the overturn when a gyro sensor detects that the self-propelled body D is overturned. The determination of the out of line detected by the line sensor and the determination of the overturn detected by the gyro sensor can be performed by the conventional method. In the game system GS, the type of the trouble status is recognized by a trouble code indicating the trouble status.

During the game, a trouble process is performed in the chassis K (Step S92). The trouble process will be described later. In the trouble process, the later-mentioned warning information or error notification is transmitted to the center server CS in the predetermined case. The center server CS stores the received warning information or error notification as error log information in the server storage unit 12 (Step S93). That is, a value of trouble parameters and error numbers each being correlated with the self-propelled body ID and the game machine ID are stored in the server storage unit 12 as the error log information. The trouble parameters and the error numbers will be described later. The center server CS periodically generates copy data of the error log information stored in the server storage unit 12 and transmits the copy data to the maintenance server MS (Step S94). Then, the center server CS deletes the error log information, transmitted to the maintenance server MS, from the server storage unit 12 (Step S95). The maintenance server MS stores the received error log information in the maintenance storage unit MDB as error history information (Step S96).

Figure 12:
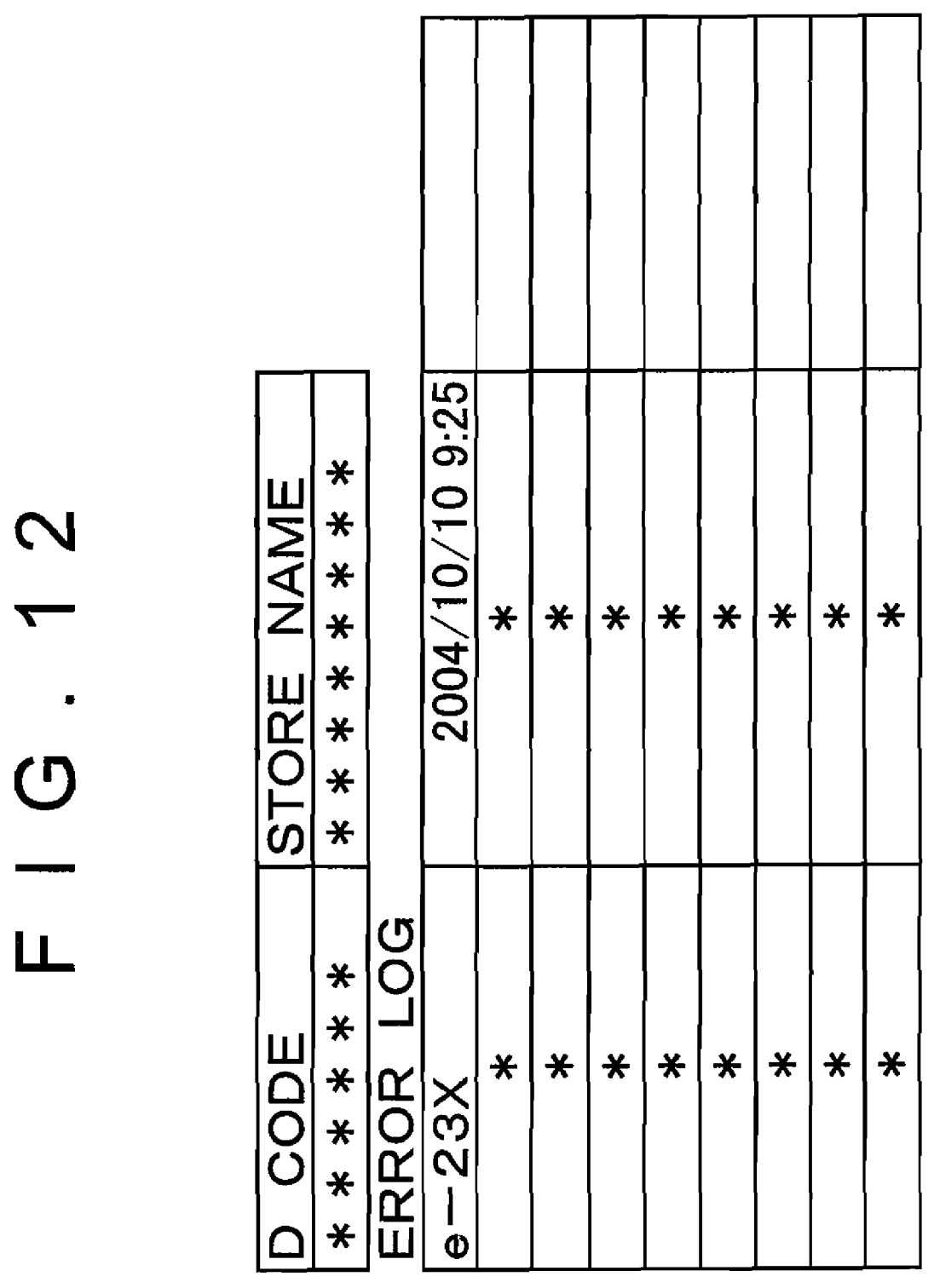

The maintenance client MC makes a request about the error log information to the maintenance server MS as appropriate (Step S97). In the maintenance server MS, a process corresponding to the request from the maintenance client MC is performed based on the error history information stored in the maintenance storage unit MDB (Step S98). For example, the request about the error log information includes a display of a list obtained by statistically processing the pieces of error log history information within a predetermined period, and the like. FIGS. 12 to 14 show examples of the list obtained by statistically processing the pieces of error log history information. FIG. 12 shows a list with respect to error generation information in each store. Only the information on the error correlated with the specific D code can be extracted from the error log history information to display the list.

FIG. 13 shows a list of the number of error occurrences and the number of warning occurrences in each store on a specific day. The number of error occurrences means the number of times in which the error notification is transmitted from the chassis K, and the number of warning occurrences means the number of times in which the warning information is transmitted from the chassis K. FIG. 14 shows a list of the values of the trouble parameters for each self-propelled body. As shown in FIG. 14, also the values of the status parameters obtained from the status confirmation information may simultaneously be displayed in the list of the trouble parameters.

The trouble process performed in the chassis K will be described with reference to the flowchart of FIG. 15. The main control unit 27 determines whether or not the chassis K is in the error occurrence status (Step S100). The term of "error occurrence" shall mean the trouble status in which it becomes impossible to continue the game and the game is stopped. When the main control unit 27 determines that the chassis K is not in the error occurrence status, the main control unit 27 determines whether or not the trouble information is received from the self-propelled body D (Step S110). When the main control unit 27 determines that the trouble information is received, the main control unit 27 updates the value of the trouble parameters corresponding to the trouble status indicated by the received trouble information (Step S120). Examples of the trouble parameter corresponding to the trouble status include an out of line LO, an overturn TO, a move delay MD, and a power failure PF and so on. Hereinafter they are referred to as "the trouble parameter" except for when the distinction is needed. The trouble parameter is the accumulation value of the number of occurrences of the trouble status corresponding to the trouble parameter. For example, the value of the out of line LO is incremented by one when the received trouble information indicates the out of line.

Then, the main control unit 27 determines whether or not it is needed to give a warning of the trouble status corresponding to the updated trouble parameter to the center server CS (Step S130). For example, when the value of the updated trouble parameter exceeds a predetermined criterion value, the main control unit 27 determines that it is needed to give the warning. The trouble parameters and the criterion values corresponding to the trouble parameters are previously stored in the game machine storage unit 26.

In Step S130, when the main control unit 27 determines that it is needed to give the warning to the center server CS, warning information is generated and transmitted (Step S140). The warning information includes the self-propelled body ID, the game machine ID, the D code, the trouble parameter, transmission data and time, and so on. In Step S100, the main control unit 27 determines that the error has occurred, the error notification including the error number capable of identifying the type of error instead of the trouble parameter is generated and transmitted to the center server. The above mentioned trouble process is repeated while the game is performed in the game machine G.

The invention is not limited to the above embodiment, and can be performed in various embodiments. For example, the self-propelled body ID may be stored as the unique identification ID of the self-propelled body in the ROM of the self-propelled body. In the status confirmation system, the transmission of the status information is not limited to the time when the game ends, but the status information may be transmitted when the notification such as the request of self-propelled body ID is received from the chassis or the status information may periodically be transmitted, irrespective of the game. In the status confirmation system, a sensor for detecting the status of the chassis of itself and parameters indicating the status of the chassis based on the sensor are provided and the parameters can be included as the status information on the chassis in the game machine status information. The game machine status information can be transmitted for each provided self-propelled body.

With respect to the change of the criterion wearing level, by including a specific game machine ID or a specific self-propelled body ID in the criterion change information, the criterion change level only for the specific game machine ID or the specific self-propelled body ID can be changed. The replacement information can include replacement time information on the replacement time. For example, the replacement time information can be information indicating in the stepwise manner that the replacement time draws near according to the value of the computed replacement parameters.

The status of the power supply surface can also be confirmed by the trouble notification system. For example, in the list of FIG. 14, when the power failure state occurs in all the self-propelled bodies provided in the same game machine, it can be determined that there is a trouble with the power supply surface. Either a public line or a dedicated line can be used as the communication network, and both a wired line and wireless line can be applied. In this embodiment, the game machine transmits and receives the data to and from only the center server through the communication network. Alternatively, the game machine may directly transmit and receive the data to and from the maintenance server. The center server and the maintenance server may be directly connected without passing through the communication network.

The invention claimed is:

1. A game system having a center server and a plurality of game machines capable of transmitting and receiving data to and from the center server through a communication network, said each game machine comprising a game machine main body and a replacement part being replaceable,
wherein the replacement part comprises a part information recording device recording part identification information which can be obtained by the game machine, the part identification information being uniquely given to each replacement part in the game system,
the game machine main body comprises:
a game machine storage device storing game machine identification information uniquely given to each of the game machines in the game system;
a part information obtaining device obtaining the part identification information recorded in the part information recording device; and
a server transmission device transmitting to the center server, the part identification information obtained by the part information obtaining device together with the game machine identification information stored in the game machine storage device, and
the center server comprises:
a server storage device storing the part identification information and the game machine identification information transmitted from the game machine in association with each other.

2. The game system according to claim 1, wherein the replacement part further comprises:
a part information output device outputting the part identification information recorded in the identification information recording device to the game machine main body; and
an information output control device controlling output time of the part identification information of the part information output device, and
the part information obtaining device of the game machine main body obtains the part identification information outputted from the part information output device.

3. The game system according to claim 2, wherein the replacement part is a self-propelled body, the game machine main body further comprises:
a part communication device transmitting and receiving information on operation of the replacement part to and from the replacement part,
the replacement part further comprises:
a game machine communication device transmitting and receiving information on operation of the replacement part to and from the game machine main body; and
an operation control device controlling the operation of the replacement part based on the information on operation of the replacement part transmitted and received by the game machine communication device.

4. The game system according to claim 3, wherein the game machine further comprises a traveling surface, the game part is the self-propelled body traveling on the traveling surface, and the part identification information is motor identification information which is uniquely given to a motor provided in the mobile body.

5. The game system according to claim 4, wherein the replacement part comprises a status information storage device storing status information indicating a status of the replacement part,
the part information output device outputs the status information together with the part identification information,
the part information obtaining device of the game machine main body obtains the status information together with the part identification information,
the server transmission device transmits to the center server the status information together with the part identification information and the game machine identification information, and
the server storage device of the center server further stores the status information in association with the part identification information.

6. The game system according to claim 5, further comprising a maintenance server transmitting and receiving data to and from the center server,
the center server copies storage contents of the server storage device into a maintenance storage device of the maintenance server, and
the maintenance server generates maintenance information on maintenance of the replacement part based on the part identification information, the game machine identification information, and the status information, which are stored in the maintenance storage device.

7. The game system according to claim 3, wherein the replacement part further comprises a status information storage device storing status information indicating a status of the replacement part,
the part information output device outputs the status information together with the part identification information,
the part information obtaining device of the game machine main body obtains the status information together with the part identification information,
the server transmission device transmits to the center server, the status information together with the part identification information and the game machine identification information, and the server storage device of the center server further stores the status information in association with the part identification information.

8. The game system according to claim 7, further comprising a maintenance server transmitting and receiving data to and from the center server, the center server copies storage contents of the server storage device into a maintenance storage device of the maintenance server, and the maintenance server generates maintenance information on maintenance of the replacement part based on the part identification information, the game machine identification information, and the status information, which are stored in the maintenance storage device.

9. The game system according to claim 2, wherein the replacement part further comprises a status information storage device storing status information indicating a status of the replacement part, the part information output device outputs the status information together with the part identification information, the part information obtaining device of the game machine main body obtains the status information together with the part identification information, the server transmission device transmits to the center server, the status information together with the part identification information and the game machine identification information, and the server storage device of the center server further stores the status information in association with the part identification information.

10. The game system according to claim 9, further comprising a maintenance server transmitting and receiving data to and from the center server, the center server copies storage contents of the server storage device into a maintenance storage device of the maintenance server, and the maintenance server generates maintenance information on maintenance of the replacement part based on the part identification information, the game machine identification information, and the status information, which are stored in the maintenance storage device.

* * * * *